Sept. 20, 1932.   W. I. THRALL   1,878,060
GAS REGULATING APPARATUS
Filed Nov. 6, 1931   2 Sheets-Sheet 1

Inventor
Walter I. Thrall
By Lyon+Lyon
Attorneys

Inventor
Walter I. Thrall

Patented Sept. 20, 1932

1,878,060

UNITED STATES PATENT OFFICE

WALTER I. THRALL, OF ALHAMBRA, CALIFORNIA, ASSIGNOR, BY MESNE ASSIGNMENTS, TO RELIANCE REGULATOR CORPORATION, OF ALHAMBRA, CALIFORNIA, A CORPORATION OF CALIFORNIA

GAS REGULATING APPARATUS

Application filed November 6, 1931. Serial No. 573,378.

This invention relates to fluid pressure regulating apparatus, and while the invention may be practiced in connection with regulating apparatus for various purposes, in the present specification, the invention is described as applied to a gas regulating apparatus.

In the distribution of gas to consumers, particularly where gas is employed in manufacturing purposes, there are frequently sudden and wide variations in the quantity of gas consumed. It is, however, necessary to maintain a substantially constant pressure in the consumer's burners. For these reasons, it is the common practice to employ reducing valves which receive the gas under relatively high pressure, and supply it to the service static line, so as to maintain as far as possible a substantially constant anemometer pressure in the static line. It has been the practice heretofore to provide pressure controlled means depending upon variations in the static pressure to regulate the reducing valve accordingly, that is to say, if a sudden increase in consumption of gas in the static line occurs, then the automatic regulating apparatus increases the opening of the reducing valve so as to accommodate the increased demand for the gas. These effects have usually been accomplished through the medium of a pressure regulating device connected directly with the reducing valve and cooperating with a pilot valve which has been automatically controlled to regulate the supply of the gas under pressure to the pressure chambers which regulate the reducing valve. Heretofore, the gas which has been supplied to the pilot and pressure regulating device for the reducing valve has been vented to the atmosphere. This practice is objectionable and dangerous although the amount of gas passing to the atmosphere may in some cases be very small.

The general object of this invention is to provide pressure regulating apparatus of this kind which is simple in construction and in which the gas taken off from the high pressure side for the regulation of the reducing valve will not be vented to the atmosphere, but will be turned into the static line.

A further object of the invention is to provide regulating apparatus of this kind which will be very sensitive in operation, and quickly move the reducing valve to the proper effective opening to maintain a substantially constant manometer pressure in the static line; also to provide a means whereby the apparatus can be readily adjusted at will to change the static pressure in the static line. For example, if consumption of gas in a branch from the static line becomes unusually great, it may be necessary to adjust the apparatus to maintain an abnormally high manometer pressure in the static line. One of the objects of my invention is to enable this to be accomplished. At the same time constructing the apparatus so that under normal operating conditions it will maintain a substantially constant pressure in the static line in spite of wide variations occurring in the amount of gas being consumed from the line.

A further object of the invention is to provide apparatus of this kind which will operate automatically to close the reducing valve in case the consumption of gas in the line suddenly stops in such a way as to cause a "backing up" of pressure in the line.

In the operation of reducing valves and pilot valves used in apparatus of this kind, it may happen that particles of grit or dirt may become lodged on the valve seat or seats in such a way as to interfere with the regular automatic movement of the valves toward their closing positions. Under such circumstances, it is desirable not to continue merely the normal control of the valves by the slight differential pressure which normally controls their movements, but to provide means for forcibly closing such valves so as to crush any such solid matter on the seat of the valve, that is, between the valve seat and the valve closure. One of the objects of my invention is to provide automatic means for accomplishing this result and for automatically controlling the reducing valve and the pilot valve so as to forcibly close the reducing valve if it is prevented by dirt or grit from approaching its closing position in the normal operation of the apparatus; also to provide for freeing the pilot valve of such particles of grit lodging on its seat.

A further object of the invention is to provide apparatus of this kind having an improved gravity closing reducing valve which is of a balanced type, thereby avoiding the necessity for employing any springs in connection with the reducing valve, and at the same time providing a pressure regulating device, particularly adapted to cooperate with the pilot valve employed in my apparatus and with other features of my improvements.

Further objects of the invention will appear hereinafter.

The invention consists of novel parts and combinations of parts to be described hereinafter, all of which contribute to produce an efficient gas regulating apparatus.

A preferred embodiment of the invention is described in the following specification, while the broad scope of the invention is pointed out in the appended claims.

In the drawings—

Figure 4 is a vertical section through a check valve illustrated in Figure 1, that is to say, this section is taken on the line 4—4 of Figure 1;

Figure 5 is a vertical section upon an enlarged scale taken about on the line 5—5 of Figure 1, and further illustrating details of the pilot valve and its controlling means;

Figure 6 is a fragmentary view, being a side elevation and illustrating a detail of a modified embodiment of my invention.

Figure 1:
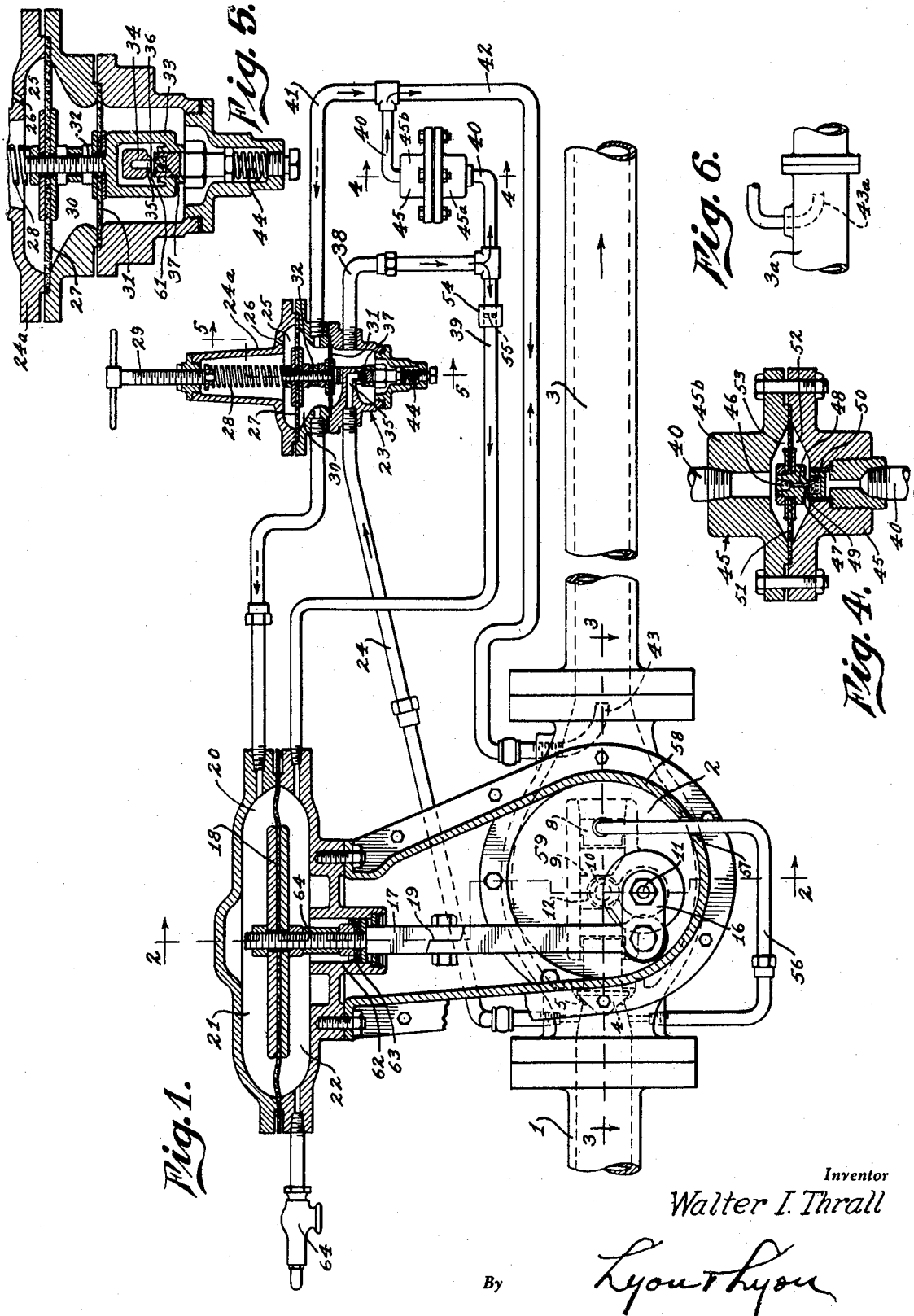
Figure 1 is a diagrammatic arrangement of a regulating apparatus embodying my invention, certain parts being shown in cross-section, and other parts being broken away or shown in elevation.
Figure 2:
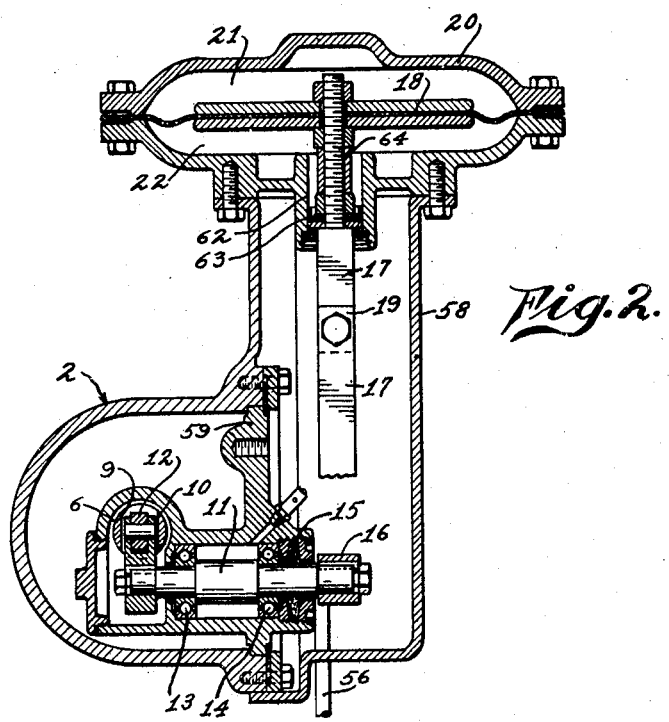
Figure 2 is a vertical section taken about on the line 2—2 of Figure 1, and further illustrating details of the reducing valve and its controls.
Figure 3:
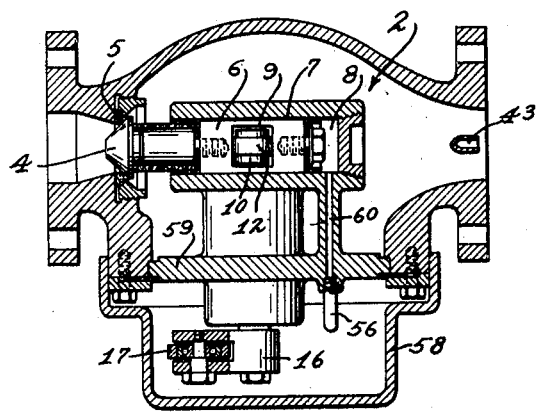
Figure 3 is a horizontal section taken about on the line 3—3 of Figure 1 passing through the axis of the reducing valve closure.

Referring more particularly to the parts, and especially to Figure 1, 1 indicates a source of supply of a fluid under pressure; for example, a pipe line which may carry a fluid such as gas under a relatively high pressure, such as one hundred (100) pounds per square inch. This gas under pressure is delivered through a reducing valve 2 into a static line 3. The reducing valve is preferably of a gravity closing type, that is, if there is no pressure in the line, the value will close by gravity. The reducing valve illustrated is my invention, and is covered by a co-pending application entitled Pressure regulator, Serial No. 573,379, filed November 6, 1931. Referring to Figures 2 and 3, the reducing valve includes a valve closure 4 that is normally located near an annular seat 5 and the opening is automatically regulated to maintain a substantially constant pressure in the static line 3. The closure 4 of the valve is attached at its rear end to a plunger 6 that is guided to slide freely to and fro in a cylinder 7 and at the back end of this plunger the cylinder is provided with a balancing chamber 8 to which the high pressure fluid or gas is admitted to balance the pressure on the forward end of the valve closure, as will be described hereinafter.

The plunger 6 may be in the form of a solid piston and its middle portion is cut out to form a socket 9 receiving the short arm 10 which is attached to a rock shaft 11, and this arm carries an anti-friction roller 12 to reduce the friction necessary to move the plunger to and fro. The rock shaft 11 is mounted in suitable ball bearings 13 and 14 and extends out through a suitable stuffing box 15 beyond which it is provided with an arm 16 which is attached to a connecting rod or pitman 17. The upper end of this piston is connected to a pressure controlled member, which, in the present instance, consists of a diaphragm 18. In order to facilitate gaining of access to the parts when it is necessary to remove the valve, the connecting rod 17 is preferably provided with a joint 19.

The diaphragm 18 is mounted in an upper casing 20 located above the reducing valve, and it will be evident that as the arm 16 projects from the rock shaft 11 in the direction of the valve closure, the weight of the connecting rod 17 and attached parts is exerted in a direction to move the valve closure 4 against its seat.

The casing 20 and the diaphragm 18 constitute a pressure regulating device for automatically regulating the position of the valve closure 4, and this is accomplished through the agency of differential pressure between an upper pressure chamber 21, which I call the "closing" pressure chamber, and a lower pressure chamber 22, which I call the "opening" pressure chamber. I refer to these chambers in this way because an increase of pressure in the closing pressure chamber will tend to move the diaphragm 18 downwardly and close the valve, whereas an increase of pressure in the chamber 22 will have a reverse effect.

The chambers 21 and 22 are supplied with the fluid from the high pressure side of the apparatus, that is, before the fluid or other gas passes the reducing valve. The apparatus for this purpose includes a pilot valve 23, which, in the present instance, is connected by pipe connection 24 with the high pressure side of the reducing valve. I provide a pressure-controlled device having the same pressure as that of the closing chamber 21 for regulating the amount of opening through the pilot valve. In the present instance, I have shown the pressure controlling device for the pilot valve mounted in a bonnet 24ª directly above the pilot valve, the interior 25 of the bonnet being vented to the atmosphere through a vent 26. This pressure controlled device may be of any desired construction, but is preferably of a type which enables it to be loaded with a load variable at will.

In the present instance, I employ a diaphragm 27 which is loaded by a spring pressed on its upper side by a coil spring 28, the state of compression of which is controlled by an adjusting screw 29 that screws in through the upper end of the bonnet. Below the diaphragm 27, this pressure regulating device has a pressure chamber 30 to which the fluid or gas is admitted (as will be described hereinafter) and the underside of this chamber 30 may be closed by a suitable stuffing box, but preferably by means of a flexible diaphragm 31 from which a stem 32 extends downwardly to connect with the valve closure 33 of the pilot valve, said valve closure being in the form of a yoke extending around a nozzle 34 that is supplied with the fluid from the pipe 24, and which has an outlet 35 on its underside (see Figure 5). Around this outlet, I prefer to form a knife edge type of seat 36 and the valve closure 33 is provided with a suitable gasket 37 to cooperate with the knife edge seat. With this construction for the pilot valve, it will be evident that if the spring 28 is properly compressed by means of the screw 29, to support the pressure of gas in the chamber 30 and this pressure in the chamber should rise abnormally, the valve closure will move nearer to its seat 36. In other words, in the operation of the apparatus, this pilot valve is normally slightly opened and its amount of opening is regulated by the pressure in the pressure chamber 30.

The fluid or gas that passes through the pilot valve 23 is supplied to the two pressure chambers 21 and 22 preferably by branch connections corresponding respectively to these two chambers. In the present instance, I provide the pilot valve 23 with an outlet connection or pipe 38 (see Figure 1), which connects to two branch pipes 39 and 40, the former of which is connected to the pressure chamber 22 and the latter of which connects to an extension 41 leading to the chamber 21, and in this latter branch, the pressure regulating valve is attached.

The connection 41 is virtually merely an extension of the branch 40 and at the point of connection between these two pipes 40 and 41, I provide means for connecting all the regulating apparatus to a duct or pipe connection 42 to the static line 3. If desired, this may be accomplished through the medium of a pilot tube 43 mounted in the casing of the reducing valve.

Referring again to the pressure controlling device for the pilot valve, the lower end of the yoke 33 that constitutes the valve closure is provided with balancing means, such as the spring 44 (see Figure 5), exerting its force in a direction to move the valve closure toward its seat. This insures proper closing of this valve if there is no pressure existing in the chamber 25 above the diaphragm 27.

The branches 39 and 40 should be so related that the resistance of flow from the connection 38 through the pipe 39 will be less than the resistance of flow through the branch 40. In order to accomplish this, in the branch 40, I prefer to provide a check valve 45 (see Figure 4), which is so constructed that it operates as an ordinary check valve as regards the flow of gas through it, coming from the pipe 38, but, which, upon a back pressure developing in the pipe 40 beyond the check valve, will close positively, so as to prevent any possible leak occurring through the check valve. In this way, I provide for increasing the resistance of flow through this pipe 40, and maintaining this relation in the resistance of flow through the pipe 39, and this is accomplished through the medium of a small ball check valve 46 mounted in a ball carrier 47, and checking flow through a port 48 in the ball carrier.

At the lower end of this port, a knife edge closure 49 is provided to come upon a suitable seat 50 fixed in the underside of the casing section 45a of the check valve. This ball carrier is mounted in a flexible diaphragm 51 which is clamped between the section 45a of the check valve casing and an upper section 45b. With this construction, it will be evident that as regards back flow in the pipe 40, I do not have to rely upon the "tightness" at the ball check because the pressure on the diaphragm will force the ball carrier 47 down against the seat 50, and effectively close the valve against back flow. When the pressure on the chamber 52 under the diaphragm slightly exceeds the pressure in the chamber 53 above the diaphragm 51, this diaphragm moves upwardly slightly so as to move the ball carrier 47 away from the seat 50, and open the lower end of the port 48. At this time, the ball check 46 performs its function of permitting flow past it, but restricts the flow so as to make it easier for the gas to flow from the pipe 38 through the pipe 39 to the "opening" pressure chamber 22.

It is not advisable, however, for flow of gas through the pipe 39 to be too free, because this would tend to cause continued oscillation of the diaphragm 18 of the pressure regulating device 20.

In order to restrict somewhat the flow through the pipe 39, and at the same time develop a slightly higher pressure normally in the chamber 22, I provide a coupling 54 in the pipe connection 39 which carries an orifice disc 55. By using such a disc and selecting the proper sized orifice through it a very nice relation can be established between the relative resistance to flow of the gas through the pipe 40 and through the pipe 39.

The reducing valve 2 (see Figure 3) is provided at the back end of the plunger 6 with a balancing chamber 8 already referred to. This chamber is supplied with gas under pressure from the gas supply pipe 1 through a suitable pipe connection 56 (see Figure 1), which pipe extends upwardly through a notch 57 in the cover 58 of the reducing valve, and has its end connected to the outer face of a cover disc 59 (see Figure 3) that seats on the forward side of the casing of this reducing valve so as to connect with a port 60 that leads into the chamber. In this way, pressure is developed at the rear of the plunger 6 to balance the pressure on the inner face of the valve closure 4.

If desired, the connection from the pipe 42 into the static line may be made, not through the casing of the reducing valve 2 as shown in Figure 1, but may be made at a point somewhere along the static line at a distance from the reducing valve. This would tend to increase the differential of pressure between the gas in the chambers 21 and 22 and would tend to make the apparatus more sensitive in its regulating operation when the pressure rises in the static line. Such a connection is illustrated in Figure 6 in which a pitot tube 43a is placed in a connection 3a in the static line which is supposed to be at a distance from the reducing valve 2.

In the operation of the pilot valve, it may develop a tendency to oscillate continuously so that the yoke 33 will move slightly up and down, and in order to overcome this tendency I prefer to form the gasket 37 with a small conical tip 61 that projects centrally into the port 35 of this valve.

Referring again to the reducing valve 2, and particularly to Figure 1, it will be noted that the underside of the casing 20 for the regulating chamber is provided with a bore 62 in which a gas tank piston 63 moves. This piston is attached by connection 64 to the diaphragm 18 and its underside is connected to the connecting rod 17 which is in axial alinement with the bore. The axis of the arm 16 that attaches to the lower end of the connecting rod 17 is substantially at right angles to the longitudinal axis of the connecting rod so that as the rod shifts up and down with movements of the diaphragm there is very slight shifting of the lower end of the connecting rod in a horizontal direction. Any slight shifting that does occur is taken up by the tilting of the diaphragm 18, and the piston 63 is constructed so as to permit these slight movements of the connecting rod out of true alinement with the axis of the bore.

It sometimes happens that small solid particles or grit may be carried along in the gas, and it might happen that such particles of grit would become lodged on the valve closure 4 or its seat or they might lodge in a similar way in the pilot valve. This might interfere with the proper closing movements of these valves in the operation of the apparatus. It is evident that if these valves fail to close in accordance with the control apparatus, the pressure in the static line 3 would tend to rise considerably. In order to prevent such an occurrence, and to provide for keeping these valves clear of obstructions, I provide means for relatively increasing the pressure in the closing chamber 21 to effect the forcible closing of the reducing valve to crush any such grit or particles on the seat. In order to accomplish this, I provide means whereby an abnormal rise in pressure in the chamber 22 will be suddenly relieved. For this purpose, I provide a relief valve 64 which is set to accommodate a high pressure which might be developed in the chamber 22 under such conditions. As soon as this pressure 22 is relieved, evidently the unbalanced pressure in the chamber 22 will cause the reducing valve to close forcibly. As soon as the pressure 22 builds up again due to the closing of the relief valve 64, the apparatus will return to its normal regulating relation. Sudden relief of the pressure in the chamber 22 due to the opening of the relief valve would also reduce the pressure in the interior of the pilot valve below the diaphragm 31. This would enable the diaphragms 31 and 27 to move down under the action of the spring 28, suddenly, and thereby suddenly increase the amount of opening in the pilot valve. If any grit has lodged on this valve to prevent its closing, such grit would be blown off by this sudden blast permitted through the pilot valve.

The general mode of operation of the apparatus will now be briefly described:

Fluid, for example gas, is delivered at a relatively high pressure as one hundred (100) pounds per square inch at the pipe connection 1. The reducing valve may be set to reduce this pressure to any amount desired, for example, ten (10) pounds per square inch in the static line 3. In the normal operation of the apparatus, the reducing valve is slightly open and so is the pilot valve. Through the connections, including the pipe 24 and the connections leading from the pilot valve, the pressure chambers 21 and 22 are constantly supplied with gas under pressure, and the pressure in the chamber 22 will be slightly higher than the pressure in the chamber 21, thereby overcoming the weight of the valve parts and holding the valve closure 4 slightly off its seat 5. During this time, the pressure chamber 30 of the pilot valve is also under pressure corresponding to the pressure in the chamber 21 and holding the spring 28 more or less compressed. Furthermore, in the normal operation there would be substantially no flow of gas to and fro in the pipe connections, but a static condition would be maintained.

If the consumption of gas supplied through the static line 3 increases, a slight fall in pressure in the static line occurs. This develops a flow of gas through the pilot valve and its pipe connections as indicated by the full line arrows placed on these connections. Under these conditions, due to a reduction of pressure in the static line a movement of gas would occur in the pipe 42 as indicated by the full arrow on this pipe and this would immediately cause a reduction in pressure in the pressure chamber 30 of the pilot valve. In order to insure that the reduction in pressure will be immediately effected at the chamber 30, it is preferable to have the area of the pipe 40 slightly smaller than that of pipe 41. This enables it to cooperate with the check valve 46 in resisting flow through the pipe 40 at this time. The reduction in pressure in the chamber 30 causes a slight reduction in the chamber 21, and this will cause an increase of the differential of pressure between the chambers 22 and 21 and tend to lift the diaphragm and open further the reducing valve. It also immediately causes a down movement of the diaphragm 27, thereby further opening the pilot valve 23. The action in this regard is to increase the supply of gas passing through the pilot valve if an increase occurs in the differential pressure between the supply and the static line.

The increased opening of the pilot valve produces a flow of gas as indicated by the solid arrow on the pipe 38 and this causes a flow through the pipe 39 in the direction of the full line arrow and also in the pipe 40, but the resistance through the pipe 40 is greater than that through the pipe 39 so that the pressure immediately builds up in pressure chamber 22, and further opens the reducing valve. After a few moments, however, the gas flowing through the pipe 40 will pass the check valve and increase the pressure in the pipes 41, and 42 and back up this pressure to the chambers 30 and 21, thereby establishing equilibrium with the reducing valve giving an increased flow of gas and still maintaining the working pressure of ten (10) pounds in the static line.

In case the consumption of gas supplied through the static line drops off suddenly, pressure in the static line tends to rise above ten (10) pounds, and this pressure backs up into the pipe 42 as indicated by the dotted arrow on this pipe. This backed up pressure can not pass back through the pipe 40 through the check valve 45, but does back up into the pressure chamber 30 of the pilot valve as indicated by the dotted arrows. This increases the pressure in the chamber 30 and in the chamber 21, the latter of which tends to close the reducing valve directly, and the former of which causes the diaphragm 27 to rise and move the pilot valve further toward its closed position. The pilot valve will soon establish a new differential pressure in the chambers 21 and 22 to accommodate the new condition existing in the static line 3.

It is understood that the embodiment of the invention described herein is only one of the many embodiments this invention may take, and I do not wish to be limited in the practice of my invention, nor in my claims, to the particular embodiment set forth.

What I claim is:

1. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, means for conducting the fluid from the pilot-valve to both of the said pressure chambers, and a connection from said last-named means to the static line enabling fluid to flow from either of said pressure chambers to the static line.

2. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, means for conducting the fluid from the pilot-valve to both of the said pressure chambers, a pressure device receiving the fluid, connected with one of said pressure chambers, for controlling the pilot-valve, and connections for connecting the pressure chambers to the static line and enabling fluid to flow from either of said pressure chambers to the static line.

3. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, a constantly open branch connection leading from the pilot-valve to one of the said pressure chambers, another constantly open branch connection leading from the pilot-valve to the other of said pressure chambers, and connections from said branches to the static-line enabling fluid to flow from either of said pressure chambers to the static-line.

4. In a fluid pressure regulating apparatus, the combination of a source of supply of the fluid under pressure, a pilot-valve receiving a quantity of the fluid under pressure from the said source of supply, a static line, a reducing valve between the source of supply and the static-line, a fluid-pressure controlled device having two pressure chambers with a pressure controlled member between the same and connected with the reducing valve to regulate its effective opening, a branch connection leading from the pilot-valve to one of the said pressure chambers, another branch connection leading from the pilot-valve to the other of said pressure chambers, and connections from said branches to the static-line enabling fluid to flow from either of said pressure chambers to the static-line, said branch connections having means for giving a freer flow of the fluid to the pressure chamber which opens the reducing valve when its pressure increases, than to the pressure chamber that moves the reducing valve further toward the closed position when its pressure increases.

5. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, a branch connection leading from the pilot-valve to one of the said pressure chambers, another branch connection leading from the pilot-valve to the other of said pressure chambers, and connections from said branches to the static-line enabling fluid to flow from either of said pressure chambers to the static line, the branch connection leading to the pressure chamber that moves the valve further toward the closed position by an increase of pressure having means therein for preventing a return flow in that branch toward the pilot-valve.

6. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, a branch connection leading from the pilot-valve to one of the said pressure chambers, another branch connection leading from the pilot-valve to one of the said pressure chambers, another branch connection leading from the pilot-valve, to the other of said pressure chambers, and connections from said branches to the static-line enabling fluid to flow from either of said pressure chambers to the static line, the branch connection leading to the pressure chamber that closes the valve by an increase of its own pressure having means therein for preventing a return flow in that branch toward the pilot-valve, and a pressure-controlled device in the branch connection leading to the pressure chamber in which an increase of pressure will open wider the reducing valve, connected to the pilot-valve for regulating the same.

7. In a fluid pressure regulating apparatus, the combination of a source of supply of the fluid under pressure, a pilot-valve receiving a quantity of the fluid under pressure from the said source of supply, a static line, a reducing valve between the source of supply and the static line, a fluid-pressure controlled device having two pressure chambers with a pressure controlled member between the same and connected with the reducing valve to regulate its effective opening, a connection from the pilot valve to the pressure chamber that moves the reducing valve further toward the closed position when its pressure increases, said connection including a loaded pressure regulating device connected to the pilot valve for controlling the amount of opening of the pilot-valve, said connection further including a check-valve between the pilot valve and the pressure regulating device for the pilot valve, a connection beyond the check-valve for connecting to the static line, and another connection from the pilot-valve to the pressure chamber in which an increased pressure opens wider the reducing-valve.

8. In a fluid pressure regulating apparatus, the combination of a source of supply of the fluid under pressure, a pilot-valve receiving a quantity of the fluid under pressure from the said source of supply, a static line, a reducing valve between the source of supply and the static line for supplying the fluid at reduced pressure to the static line, a fluid pressure controlled device having a pressure controlled member connected with the reducing valve to regulate its effective opening and having a "closing" pressure chamber on one side of said member operating upon an increase of pressure therein to move the reducing valve further toward its closed position, and having an "opening" pressure chamber operating upon an increase of pressure therein to open wider the reducing valve, a connection from the pilot-valve to the "opening" pressure chamber, a connection from the pilot valve to the "closing" pressure chamber and including a pressure controlled device connected with the pilot valve for regulating the same, said last-named connection also including a check-valve for checking return flow to the pilot-valve and also having a connection to the static line.

9. In a fluid pressure regulating apparatus, the combination of a source of supply of the fluid under pressure, a pilot valve receiving a quantity of the fluid under pressure from the said source of supply, a static line, a reducing valve having a valve closure with a plunger, a cylinder for guiding the plunger as the valve closure moves toward or from its seat, said cylinder having a balancing chamber at the rear of the plunger and remote from the valve-closure, means for admitting fluid from the said source of supply to the said balancing chamber, a fluid pressure controlled device having two pressure chambers with a pressure controlled member between the same connected with the reducing valve closure to regulate the position of the closure, means for conducting the fluid from the pilot-valve to both of the said pressure chambers, said last-named means having means for normally maintaining a differential pressure between the fluid in the said pressure chambers of the pressure controlled device, and having a connection connecting to the static line and enabling fluid to flow from either of said pressure chambers to the static line.

10. In a fluid pressure regulating apparatus, the combination of a source of supply of the fluid under pressure, a pilot-valve receiving a quantity of the fluid under pressure from the said source of supply, said pilot-valve having a valve closure, a static line receiving the fluid from the source of supply, a reducing valve between the source of supply and the static line, a fluid pressure controlled device having two pressure chambers with a pressure controlled member between the same connected with the reducing valve to regulate its effective opening, means for conducting the fluid from the pilot-valve to the pressure chamber that increases the effective opening of the reducing valve when the pressure increases therein, a connection from the pilot-valve to the other pressure chamber and including a pressure-controlled device controlled by the pressure in that connection, said last-named pressure controlled device having means connecting the same with the closure of the pilot valve to regulate its amount of opening, and means connecting the pilot valve and the last-named pressure controlled device to the static line.

11. In a gas pressure regulating apparatus, the combination of a source of supply of gas under pressure, a pilot-valve receiving a quantity of the gas under pressure from the source of supply, a static line, a reducing valve between the source of supply and the static line, a fluid-pressure controlled device having a pressure controlled member connected with the reducing valve to regulate its effective opening and having a "closing" pressure chamber operating upon a rise of pressure therein to move the reducing valve further toward the closed position, a connection from the pilot-valve for leading gas to the "opening" pressure chamber, a connection from the pilot-valve to the "closing" pressure chamber and including a pressure controlled device connected with the pilot-valve for regulating the amount of its opening, said connection also including a check valve between the pilot valve and its pressure controlled device, and means for connecting the last-named connection to the static line from a point between the check-valve and the pressure controlled device for the pilot valve.

12. In a gas pressure regulating apparatus, the combination of a source of supply of gas under pressure, a pilot-valve receiving a quantity of the gas under pressure from the source of supply, a static line, a reducing valve between the source of supply and the static line, a fluid-pressure controlled device having a pressure controlled member connected with the reducing valve to regulate its effective opening and having a "closing" pressure chamber operating upon a rise of pressure therein to move the reducing valve further toward the closed position, a connection from the pilot-valve for leading gas to the "opening" pressure chamber, a connection from the pilot-valve to the "closing" pressure chamber and including a pressure controlled device connected with the pilot-valve for regulating the amount of its opening, said connection also including a check valve between the pilot valve and its pressure controlling device, and means for connecting the last-named connection to the static line from a point between the check-valve and the pressure controlled device for the pilot valve, said pressure controlled device for the pilot valve operating upon an increase of pressure, to decrease the amount of opening of the pilot-valve.

13. In a gas pressure regulating apparatus, the combination of a source of supply of the gas under pressure, a pilot-valve connected to receive gas under pressure from the said supply, a static-line, a reducing valve between the source of supply and the static-line, a fluid-pressure controlled device having a pressure controlled member connected with the reducing valve to regulate its effective opening, and having a "closing" pressure chamber on one side of said member operating upon an increase of pressure to move the reducing valve further toward the closed position, said pressure controlling device having an "opening" pressure chamber on the other side of the pressure controlled member operating upon increase of pressure therein to further open the reducing valve, a connection leading from the pilot valve having a branch for leading gas to the "opening" pressure chamber and having another branch including a check-valve and connected with the "closing" pressure chamber, said last-named branch having a pressure regulating device in the same between the check-valve and the closing pressure chamber and connected with the pilot valve so that an increase of pressure in the same may close the pilot-valve, and a connection located beyond the check-valve with respect to the flow of gas from the pilot-valve leading to the static line.

14. In a fluid pressure regulating apparatus, the combination of a source of supply of gas under pressure, a reducing valve, a static line receiving the gas from the reducing valve, a pressure controlled device having a member connected with the reducing valve for regulating the amount of opening through the valve and having a "closing" pressure chamber operating when the pressure rises therein to move the valve further closed, said pressure controlled device having an "opening" pressure chamber operating when the pressure rises therein to open the reducing valve wider, a pipe connection leading off from the said source of supply, a pilot valve receiving gas from the pipe connection, a second pipe connection leading gas off from the pilot valve with a branch leading therefrom connected to the "opening" pressure chamber, and a second branch leading therefrom connecting to the "closing" pressure chamber, said last-named branch having a pressure controlled device connected into the same and connected with the pilot valve for regulating the amount of opening thereof, said second branch connection also including a means for checking a reverse flow through the same toward the pilot valve, and having a connection beyond said last-named means with respect to said pilot valve, for leading gas to the static line.

15. In a gas pressure regulating apparatus, the combination of a source of supply of the gas under pressure, a pilot valve receiving a quantity of the gas under pressure from the said source of supply, a static line, a reducing valve between the source of supply and the static line, a fluid pressure controlled device having a pressure controlled member connected with the reducing valve to regulate its effective opening and having a "closing" pressure chamber operating when the pressure in the same rises, to move the reducing valve further toward the closed position, and having an "opening" pressure chamber operating when the pressure rises therein to further open the reducing valve, a connection corresponding to the "opening" pressure chamber and leading gas to the same from the pilot valve, a connection corresponding to the "closing" pressure chamber and leading gas to the same from the pilot valve, and a pressure controlled device exposed to the pressure of the "closing" pressure chamber for regulating the opening of the pilot valve, and means for loading the pressure controlled device of the pilot valve so that a predetermined pressure in the "closing" pressure chamber will close the pilot valve, and connections from the pilot valve and its pressure controlled device for leading gas to the static line.

16. In a gas pressure regulating apparatus, the combination of a source of supply of the gas under pressure, a pilot valve receiving a quantity of the gas under pressure from the said source of supply, a static line, a reducing valve between the source of supply and the static line, a fluid pressure controlled device having a pressure controlled member connected with the reducing valve to regulate its effective opening, and having a "closing" pressure chamber operating when the pressure in the same rises, to move the reducing valve further toward the closed position, and having an "opening" pressure chamber operating when the pressure rises therein to further open the reducing valve, a connection corresponding to the "opening" pressure chamber and leading gas to the same from the pilot valve, a connection corresponding to the "closing" pressure chamber and leading gas to the same from the pilot valve, and a pressure controlled device exposed to the pressure of the "closing" pressure chamber for regulating the opening of the pilot valve, and means for loading the pressure controlled device of the pilot valve so that a predetermined pressure in the "closing" pressure chamber will close the pilot valve, and connections from the pilot valve and its pressure controlled device for leading gas to the static line, said last-named connections including a check-valve between the pilot valve and its pressure regulating device, for checking back flow of gas passing from the pilot valve.

17. In a fluid pressure regulating apparatus, the combination of a source of supply of the fluid under pressure, a pilot valve receiving a quantity of the fluid under pressure from the said source of supply, a static line, a reducing valve between the source of supply and the static line, a fluid pressure controlled device having a pressure controlled member, means connecting the pressure controlled member with the reducing valve so that the weight of the pressure controlled member is exerted in a direction to close the reducing valve, said pressure controlled device having a "closing" pressure chamber on one side of the pressure controlled member operating when the pressure rises therein, to move the reducing valve further toward the closed position, and having an "opening" pressure chamber on the other side of the pressure controlled member operating when the pressure rises therein to further open the reducing valve, means for supplying gas from the pilot valve to both of said chambers, means associated therewith for maintaining normally a slightly greater pressure in the "opening" pressure chamber than in the "closing" pressure chamber, a pressure controlled device having a pressure chamber receiving gas corresponding to the pressure in the closing pressure chamber, and connected with the pilot valve, and operating upon an abnormal rise of pressure, to close the pilot valve, and a connection enabling gas flow from the pressure chamber of the pilot valve's pressure controlled device to the static line.

18. In a fluid pressure regulating apparatus, the combination of a source of supply of the gas under pressure, a pilot valve receiving gas under pressure from the said source of supply, a static line, a reducing valve between the source of supply and the static line, a fluid pressure controlled device having a pressure controlled member with a "closing" pressure chamber on one side of the same operating when the pressure rises therein to move the reducing valve further toward the closed position and having an "opening" pressure chamber operating when the pressure rises in the same to open the reducing valve wider, said pilot valve having a closure, a pressure regulated device regulated by the pressure in the closing chamber for moving the pilot valve closure toward its closed position, means for supplying gas from the pilot valve to the "opening" pressure chamber, a connection for leading gas from the pilot valve through its pressure regulating device and thence to the "closing" pressure chamber, said last connection having a check-valve therein with a diaphragm carrying a port for the flowing gas and a relatively fixed seat cooperating with the diaphragm to check back flow through the same to the pilot valve, and a connection beyond the check valve for leading gas to the static line.

19. In a fluid pressure regulating apparatus, the combination of a reducing valve, a pressure controlled device connected with the reducing valve and having two pressure chambers so that the reducing valve is controlled by the difference of pressure in the two said chambers, means for supplying liquid under pressure to both of said chambers including a branch connection leading to one of the chambers and a second branch connection leading to the other chamber, said second branch connection having a check valve therein for checking flow in one direction, said check valve including a diaphragm with one side exposed to the pressure of the liquid flowing into the check valve, said diaphragm having a central port for the passage of the gas and having a fixed seat with which said port cooperates upon a back pressure on the diaphragm, to close the check valve.

20. In a fluid pressure regulating apparatus, the combination of a reducing valve, a pressure controlled device connected with the reducing valve and having a pressure controlled member connected with the valve for regulating the amount of opening of the valve, said pressure device having a "closing" pressure chamber operating when the pressure increases in the same to move the reducing valve further toward the closed position and having an "opening" pressure chamber operating when the pressure increases therein to open the reducing valve wider, a static line receiving fluid from the reducing valve, connections from the static line to the said pressure chambers with means therein operating to increase the pressure in the "opening" pressure chamber upon a rise of the static pressure, and a relief valve connected with the opening pressure chamber to relieve the pressure therein and cause the valve to close in case the static pressure rises unduly through a failure of the regulating movements of the reducing valve.

Signed at Los Angeles, California, this 22d day of October, 1931.

WALTER I. THRALL.